United States Patent [19]

Beresford et al.

[11] Patent Number: 4,483,945
[45] Date of Patent: Nov. 20, 1984

[54] PROCESS OF PREPARING VESICULATED POLYESTER GRANULES

[75] Inventors: Michael P. Beresford, Bourne End, England; Susan E. Potter, Frankston; Philip J. A. Ritchie, St. Kilda, both of Australia

[73] Assignee: Dulux Australia Ltd., Clayton, Australia

[21] Appl. No.: 521,666

[22] Filed: Aug. 10, 1983

[30] Foreign Application Priority Data

Aug. 10, 1982 [AU] Australia ............................... PF5317
Jul. 21, 1983 [AU] Australia ............................... PG0407

[51] Int. Cl.³ ............................................ C08V 9/28
[52] U.S. Cl. ........................................ 521/62; 521/64; 521/138; 523/336; 523/337; 523/502; 523/505
[58] Field of Search ........................ 521/62, 64, 138; 523/336, 337, 502, 505

[56] References Cited

U.S. PATENT DOCUMENTS

| | | | |
|---|---|---|---|
| 3,822,224 | 7/1974 | Gillam et al. | 521/62 |
| 3,879,314 | 4/1975 | Gunning | 521/62 |
| 3,923,704 | 12/1975 | Gunning | 521/62 |
| 4,321,332 | 3/1982 | Beresford et al. | 521/62 |

FOREIGN PATENT DOCUMENTS 1476510 6/1977 United Kingdom .

*Primary Examiner*—Morton Foelak
*Attorney, Agent, or Firm*—Cushman, Darby & Cushman

[57] ABSTRACT

A process of preparing aqueous slurries of vesiculated granules of crosslinked polyester resin wherein the granules have a maximum shrinkage on drying of 5% of the granule diameter.

The formation of aggregates of granules in the large scale production of granules using a metal oxide, hydroxide or weak acid salt as base can be overcome by using a surfactant which comprises a species

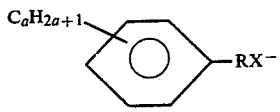

wherein $a=5-12$, X is an anion of $pK_1$ less than 2 and R is an alkylene oxide chain composed of units selected from ethylene, propylene and butylene oxides. When alkylene oxide other than ethylene oxide is present in the chain, such alkylene oxide must not provide more than two units per chain and the chain must additionally comprise at least three ethylene oxide units.

The granules prepared by the process are useful as matting and opacifying agents in, for example, coating compositions.

7 Claims, No Drawings

PROCESS OF PREPARING VESICULATED POLYESTER GRANULES

This invention relates to vesiculated polyester granules and more particularly to a process of preparing such granules. It is known that vesiculated granules of carboxylated unsaturated polyester crosslinked with ethylenically-unsaturated monomer can confer advantageous properties on coating compositions in which they are incorporated, and as a result there has been extensive usage of such granules in a variety of applications. The background to the subject is well covered in the literature, for example, in articles by Kershaw (Australian OCCA Proceedings and News, 8 No. 8, 4 (1971)), Lubbock (Australian OCCA Proceedings and News, 11, No. 5, 12 (1974)), Hislop and McGinley (Journal of Coatings Technology, 50 (642), 69 (1978)), and Bierwagen (Congress Book of the XVth FATIPEC Congress, 3E-Activities, Vol. 111, 110 (1980)). A number of patents relating to these granules and their use in coating compositions have also issued, these including U.S. Pat. Nos. 3,822,224, 3,879,314, 3,891,577, 3,923,704, 3,933,579, 4,137,380 and 4,321,332.

The preferred process of preparation of such granules is now well established. It is a "double emulsion" process wherein water is first stably dispersed in a solution in polymerisable monomer of a carboxylated unsaturated polyester to give a "first emulsion" and the first emulsion is itself stably dispersed in water to give a "double emulsion". Free radical polymerisation is then initiated to give vesiculated granules of crosslinked polyester resin. If pigmented vesiculated granules are required, pigment may be dispersed in either or both of the first emulsion components using conventional pigment dispersants.

The state of the art in granule technology is represented by the "dimensionally stable" vesiculated granules of Gunning, Henshaw and Lubbock (U.S. Pat. No. 3,879,314), the improved process of preparing such granules of Gunning and Lubbock (U.S. Pat. No. 3,923,704) and the process of Beresford and Braun (U.S. Pat. No. 4,321,332) wherein the inventors demonstrate the achievement of dimensional stability without the need for the polyamine bases of Gunning. In this last-named patent, the polyamine required for stabilisation of the first emulsion was replaced by an oxide, hydroxide or weak acid salt of a selected metal cation; in this way, the odour and yellowing effects of the polyamine could be considerably reduced (these granules shall hereinafter be referred to as "oxide granules"). Both of these types of granules have been used successfully in coating compositions.

However, it has sometimes been found that when oxide granules are prepared on a large scale, there is an unacceptably high incidence of "grit" particles, that is, aggregates of two or more granules which are formed during large scale production thereof. One cause of this is the coming together and partial coalescence of individual granules prior to curing; on polymerisation initiation, they fuse to give "grit" particles. These particles may be visible to the naked eye and their presence in coating compositions is highly undesirable as they appear as visible imperfections in the film.

We have now found that it is possible to reduce considerably and often completely eradicate the incidence of grit in oxide granules. Further, we have found that it is possible to achieve with both oxide and polyamine granules opacities which are consistently higher than those previously attained. We therefore provide, according to the present invention, a process of preparing vesiculated granules of crosslinked carboxylated polyester resin by a process comprising the steps of (a) forming a dispersion of particles of a solution in ethylenically unsaturated monomer of a carboxylated unsaturated polyester resin having an acid value of from 5–50 mg.KOH/g, the solution also containing water droplets which are dispersed in the presence of a base selected from (i) a water-soluble polyamine which contains at least three amine groups per molecule and which has a dissociation constant (pKa value) of 9.5–10.5; and
(ii) a metal oxide, hydroxide or salt wherein the metal cation is chosen from the group consisting of calcium, magnesium, barium, titanium, zinc, lead, strontium and cobalt, the salt being one wherein the $pK_a$ value of the conjugate acid of the anion is greater than 2;

the dispersion additionally containing a surfactant, and (b) initiating free radical polymerisation to crosslink the polyester and monomer and give crosslinked, vesiculated granules, characterised in that (c) where a water-soluble polyamine is used, there are present from 0.3–4.0 amine groups per polyester carboxyl group;
(d) where a metal oxide, hydroxide or salt is used, there is present from 0.8–1.8 equivalents of metal cation per equivalent of polyester carboxyl group; and
(e) the surfactant comprises a species of the formula

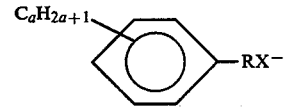

where
a is 5–12;
where
R is an alkylene oxide chain having from 2–12 alkylene oxide units selected from ethylene oxide, propylene oxide and butylene oxide, the units being selected such that when there is present in the chain alkylene oxide which is not ethylene oxide, such alkylene oxide shall comprise on average a maximum of two units per chain and such chain shall additionally comprise on average at least 3 ethylene oxide units; and
where
X is an anion having $pK_1$ of less than 2.

Carboxylated unsaturated polyester resins which will crosslink by reaction with unsaturated monomers are well known. Suitable polyester resins are the condensation products of dicarboxylic acids (or their corresponding anhydrides) and dihydric alcohols, polymerisable unsaturation being introduced into the chain by the use of a proportion of α,β-ethylenically unsaturated acid.

The polyester resins from which a selection is made are condensation products of polybasic acids (or the corresponding anhydrides) and dihydric alcohols. Polymerisable unsaturation is introduced into the molecule by the selection of an α,β-ethylenically unsaturated acid, optionally in combination with a saturated acid or anhydride.

Thus suitable acids are, for example:
unsaturated aliphatic acids, e.g. maleic, fumaric and itaconic acids;
saturated aliphatic acids, e.g. malonic, succinic, glutaric, adipic, pimelic, azelaic, tetrahydrophthalic, chlorendic and sebacic acids; and
saturated aromatic acids, e.g. phthalic, isophthalic, terephthalic, tetrachlorophthalic, trimellitic and trimesic.

Suitable dihydric alcohols are chosen from, for example, ethylene glycol, poly(ethylene glycols) e.g. diethylene glycol, hexane 1, 6-diol, propylene glycol, dicyclohexanol and neopentyl glycol. Alternatively, the alcohol may be one which initially contained three or more hydroxyl groups, the groups in excess of two optionally being at least in part etherified with, for example, a monohydric alcohol e.g. methanol, ethanol and n-butanol or esterified with a monobasic acid, e.g. benzoic acid, p-tert.-butyl benzoic acid and chain-like aliphatic acids of up to 18 carbons atoms chain length e.g. coconut oil monoglyceride.

The methods by which unsaturated polyesters of this type are formulated and made are well known in the art.

It is essential to the working of our invention that the acid value of the polyester lie within certain limits. We have found it essential to select polyesters whose acid values lie in the range 5–50 mg KOH/g, preferably 10–25 mg KOH/g and most preferably 15–20 mg KOH/g.

The unsaturated monomer in which the unsaturated polyester resin is dissolved and crosslinked must be essentially water-insoluble. Monomers which have a solubility at 20° C. of less than 5% (w/w) in water are considered to be suitably water-insoluble for our purpose. A single monomer or a mixture of monomers may be used and in general the monomer will contain only a single polymerisable double bond. However, it is known that polyfunctional monomers, that is, monomers containing more than one polymerisable double bond, may also be used to cross-link unsaturated polyester resins. Such polyfunctional monomers are, however, normally present only as a minor constituent of a mixture of monomers, the major proportion of which is monofunctional monomer. Hence mixtures comprising e.g. divinyl benzene may be used in the performance of our invention.

The preferred ethylenically unsaturated monomers for general use in our process are selected from styrene, the mixed isomers of methyl styrene commercially available as 'vinyl toluene' and methyl methacrylate, because of the ease with which they can be copolymerised with the unsaturated polyester resin. For the best results, we prefer that the monomer shall comprise at least 50% by weight of styrene.

The choice of monomer is not, however, restricted to the above monomers alone. Bearing in mind the requirements that the total monomer must be essentially insoluble in water and also be a solvent for the unsaturated polyester resin, there may be present in a minor proportion other polymerisable unsaturated monomers to, for example, modify the physical properties of the co-reacted resins. Typical co-monomers are, for example, ethyl acrylate, n-butyl methacrylate, acrylonitrile, and triallyl cyanurate. In general, we have found that the upper limit of usefulness of such monomers is 10% by weight based on the total monomer used. Higher concentrations give granules which are either too brittle or too rubbery to be used effectively in paints.

Optionally a few percent by weight of a non-polymerising organic liquid, e.g. n-butanol or toluene, may be mixed with the monomer to increase the solubility of the polyester resin therein or may be introduced as an incidental part of the process, e.g. in preparing the polyester.

There is included in the dispersions according to our invention a surfactant which comprises a species of the formula

where a, R and X have the meanings described hereinabove. The species should preferably have the formula

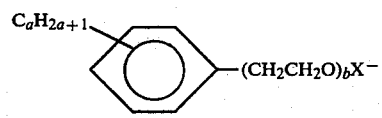

where a is 5–12 and b is 2–11. The anion X may be selected from any suitable anion and such anions as sulphate, maleate and succinate may be used. Typical examples of suitable species are the sulphates of nonylphenol and dodecylphenol ethoxylates wherein the the alkylene oxide chain comprises at least 5 ethylene oxide units.

When only ethylene oxide is present in the alkylene oxide chain, the number b may be as low as two, but when other alkylene oxides are present, the minimum number of ethylene oxide units is three. Furthermore, the other alkylene oxide must not comprise more than two units per alkylene oxide chain on average.

A counter ion for the species shown above may be selected from any suitable materials. Naturally, it is preferable to avoid those which confer deleterious properties; for example, some metal cations can impart quite strong colours and some organic cations confer strong odours. Counter ions which are suitable for use in our invention are, for example, $NH_4^+$, $Mg^{2+}$ and $K^+$, $NH_4^+$ being an especially preferred counter ion.

The surfactant is typically present to the extent of from 0.75–7.5% (preferably 3.0–4.5%) by weight of dispersant solids per volume of total granule solids and may be added initially to any of the phases of the dispersion prior to polymerisation.

The base used in this invention may be selected from the polyamine bases of the variety described by Gunning in U.S. Pat. Nos. 3,879,314 and 3,923,704 or the metal oxide, hydroxide and salt bases described by Beresford in U.S. Pat. No. 4,321,322, the disclosures of these documents being incorporated herein by reference. We have found that for our purposes the best base is magnesium oxide. When an amine base is used, sufficient amine should be present such that there are present from 0.3–4.0, preferably 1.3–3.2 amine groups per polyester carboxyl group. When a metal oxide, hydroxide or salt base is used, sufficient base should be present such that there is present from 0.8–1.8 equivalents of metal cation per equivalent of polyester carboxyl group.

When pigmented granules are desired, the pigment may be selected from any suitable pigment known to the art. We have found that commercial enamel grades of rutile titanium dioxide are the best pigments for our purposes. A large number of these are available and their suitability for use in our process varies according to the nature and size of the coating on the pigment particles. The most suitable pigments for use in a given formulation are best determined by trial and error. It is permissible to use other primary pigments and extenders such as calcite and barytes.

Our preferred method of preparation of granules is the "double emulsion" method referred to hereinabove. A process of preparing unpigmented vesiculated granules in a "single emulsion" is known. In this process, described by Gillan and Kershaw in U.S. Pat. No. 3,822,224, a carboxylated unsaturated polyester resin is dispersed in water and polymerised, the vesicles forming spontaneously within the dispersed resin globules. It was thought, however, that where pigmentation of the granules was desired, a double emulsion process was still essential for optimum vesiculation and pigment dispersion and utilisation. We have now found that our process allows us in some circumstances to prepare pigmented vesiculated granules using a single emulsion process. This option is a potentially very valuable one as it offers reduced production times and increased convenience of handling.

The initial stage in the preparation of dimensionally stable granules according to the present invention by the "double emulsion" process is the emulsification of water into the solution in ethylenically unsaturated monomer of carboxylated unsaturated polyester resin (the solution in ethylenically unsaturated monomer of carboxylated unsaturated polyester resin shall hereinafter be referred to as "the polyester solution" and the emulsion of water in the polyester solution shall hereinafter be referred to as "the first emulsion"). This is carried out by mechanical agitation which is continued until the viscosity of the emulsion is essentially constant. We have found that, during this stage, it is essential that the rate of agitation be carefully regulated. The maximum rate of agitation depends on the particular formulation and the type of agitation used, but as a general guide, we find that for impeller-type agitators, the maximum permissible impeller tip speed is about 10 meters per second. This speed is somewhat lower than the 15 meters per second disclosed by Gunning in U.S. Pat. No. 3,923,704, but we have found that for the purposes of this invention, tip speeds in excess of about 10 meters per second result in inferior granules. We prefer to keep the tip speed below about 8 meters per second. The agitation is carried out in the presence of the base which may be present in the polyester solution, the water or both. If pigmented granules are required, the pigment may be added at this stage, or it may be added to the water, the polyester solution or both prior to the formation of the first emulsion.

The first emulsion is dispersed in water which contains a stabiliser for the dispersed first emulsion particles and stirred until the desired granule size is achieved; this is the "double emulsion". The stabiliser may be chosen from the wide range of materials known to be suitable for this purpose but we have found that an especially suitable material is a water-soluble partially hydrolysed poly(vinyl acetate) with a molecular weight of about 100,000 and a degree of hydrolysis of 85–90%. As a general guide, we have found that a concentration of stabiliser of the order of 0.1–2.0% by weight of the total water (vesicular water & continuous phase water) gives satisfactory results. The surfactant may be added at any stage of the process prior to polymerisation and to any phase of the double emulsion.

An increase in the viscosity of the water can often assist in the dispersion of the emulsion; such an increase can be achieved by the addition to the water of a water-soluble polymeric thickener. Suitable thickeners are well known to the art and include such compounds as hydroxyethyl cellulose, typically used at a concentration of about 0.1–0.5% by weight of the continuous water phase.

Polymerisation of the polyester resin is effected by free radical means. This can be achieved by the use of a free radical initiator such as an organic peroxide or by exposure to a radiation source such as ultra-violet radiation or a radio-active element. When a free radical initiator is used it may be conveniently dissolved in the polyester resin solution before the dispersion of the solution in water or it may be added to the continuous water phase following the formation of the double emulsion. Our preferred initiation system is a redox system of diethylene triamine and cumene hydroperoxide triggered by ferrous ions derived from ferrous sulphate. These three materials are added sequentially to the continuous phase of the double emulsion.

The aqueous slurry of vesiculated polyester granules thus formed may be used directly in an aqueous latex paint, or it may be dewatered, by any convenient means, for example the method described in U.S. Pat. No. 4,154,923, and subsequently redispersed in an aqueous or non-aqueous medium, or incorporated into a paste, for example, for use as a filler or a putty.

The paint compositions prepared using granules according to our process are consistently more opaque than otherwise identical compositions comprising granules known to the art; this difference is especially marked in paint compositions with a high pigment volume concentration (PVC). It is a notable fact that even unpigmented granules prepared according to this invention confer a degree of whiteness and opacity previously conferred only by pigmented granules. These granules offer the paint technologist considerable formulation latitude; he can, for example, maintain a given paint formulation at an acceptable opacity whilst effecting considerable cost savings, or he can achieve a very high degree of opacity and whiteness at no extra cost. In addition, those paints utilising oxide granules have few of the unsightly aggregates which marred the appearance of paints utilising known oxide granules.

The invention is further described with reference to the following examples in which all parts are expressed by weight.

EXAMPLE 1

Preparation of 10 μm pigmented vesiculated polyester resin granules in which the first step involves dispersing the pigment in the resin phase.

|   |   | Parts |
|---|---|---|
| A | polyester resin[1] | 2.715 |
|   | styrene | 1.205 |
| B | titanium dioxide pigment ("Tipure"* R902 ex DuPont USA) | 10.015 |
| C | polyester resin | 5.495 |
|   | styrene | 3.349 |
| D | magnesium oxide | 0.045 |

| | | Parts |
|---|---|---|
| E | water | 9.028 |
| | surfactant[2] | 0.664 |
| | antifoam ("Foamaster"* NSI ex Diamond Shamrock Corp.) | 0.015 |
| F | water | 30.779 |
| | poly (vinyl alcohol) solution[3] | 5.837 |
| G | water | 30.271 |
| | ferrous sulphate | 0.003 |
| | diethylene triamine | 0.045 |
| H | cumene hydroperoxide[4] | 0.087 |
| I | bactericide ("Proxel"* PL ex ICI Australia Ltd.) | 0.047 |
| | 37% ammonia solution | 0.400 |
| | | 100.000 |

[1] A 65% weight solids solution of a 2.34/0.912/3.74 (molar) maleic anhydride/phthalic anhydride/propylene glycol polyester in styrene was used.
[2] An 83% weight solids solution of ammonium nonylphenol ethoxylate sulphate was used - the compound had five ethoxy units.
[3] A 7.5% weight solids aqueous solution of "Poval"* 224 (ex Kuraray Rayon) was used.
[4] A commercially available 90% weight active ingredient was used.
*trade mark The materials A were mixed and the pigment B added to A with stirring to form a millbase. Stirring was continued at high speed until the pigment was completely dispersed and the materials C were then mixed and added to the millbase. The magnesium oxide D was then added to the mixture and stirring was continued until the magnesium oxide was completely dispersed.

The materials E were mixed until homogeneous and then added to the mixture of materials A-D and stirred in to form a water-in-oil emulsion. This was the "first emulsion".

The materials F were blended together and the first emulsion added to the blend under vigorous stirring, the stirring being continued until the globules of first emulsion were about 10 um in diameter; this was the "double emulsion". All the water, ferrous sulphate (dissolved in a little water) and diethylene triamine (materials G) were then added to the double emulsion. The cumene hydroperoxide H was stirred in and the mixture allowed to cure overnight.

Finally, the bactericide (I) was added with stirring and the pH of the mixture adjusted to 8.5–9.5 with ammonia solution.

The final product was a 23% weight solids slurry of crosslinked polyester resin granules of 10 um maximum diameter; the slurry being free of "grit" particles. These are tested for shrinkage by the method of U.S. Pat. No. 3,879,314 and were found to have a shrinkage of less than 5%.

EXAMPLE 2

Use of a number of different surfactants.
Example 1 was repeated except that the surfactant was replaced in turn by the following:
(a) ammonium nonylphenol alkoxylate sulphate, wherein the alkoxylate comprises one propylene oxide and five ethylene oxide units, the propylene oxide unit being adjacent to the phenol group;
(b) as (a) but with the propylene oxide unit replaced by a butylene oxide unit;
(c) as (b) but with the butylene oxide unit at the end of the alkoxy chain remote from the phenol group;
(d) magnesium nonylphenol ethoxylate sulphate, the ethoxylate chain having five ethylene oxide units; and
(e) ammonium dodecylphenol ethoxylate sulphate, the ethoxylate chain having five ethylene oxide units.

All of these preparations gave crosslinked polyester resin granules of 10 um maximum diameter and with shrinkage of less than 5%. All of the slurries were free from "grit" particles.

EXAMPLE 3

Use of a polyester outside the preferred acid value range.
Example 1 was repeated except that the polyester resin of that example was replaced by on with an acid value of 28 (i.e. outside the preferred range of 10–25).

The preparation gave a slurry of crosslinked polyester resin granules which had a shrinkage of less than 5% but which were slightly less opaque than those of Example 1. The slurry was free from "grit" particles.

EXAMPLE 4

Use of an amine base.
Example 1 was repeated except that the 0.045 parts of magnesium oxide (Stage D) were replaced by 0.140 parts of diethylene triamine and 0.043 parts of monoisopropanolamine, and the surfactant level in Stage E was reduced from 0.664 parts to 0.445 parts.

The preparation gave a slurry of vesiculated polyester resin granules of shrinkage less than 5% but opacity slightly lower than that of the granules of Example 1. The slurry was free from "grit" particles.

We claim:

1. A process of preparing vesiculated granules of crosslinked carboxylated polyester resin by a process comprising the steps of (a) forming a water-in-oil emulsion by dispersing water in a solution of a carboxylated unsaturated polyester resin having an acid value of from 5–50 mg.KOH/g in an ethylenically unsaturated monomer, in the presence of a base selected from
    (i) a water-soluble polyamine which contains at least three amine groups per molecule and which has a dissociation constant (pKa value) of 9.5–10.5,
    (ii) a metal oxide, hydroxide or salt wherein the metal cation is chosen from the group consisting of calcium, magnesium, barium, titanium, zinc, lead, strontium and cobalt, the salt being one wherein the $pK_a$ value of the conjugate acid of the anion is greater than 2; (b) dispersing the emulsion in water to form a dispersion of the water-in-oil emulsion-in-water the dispersion additionally containing a surfactant, and
(c) initiating free radical polymerisation to crosslink the polyester and monomer and give crosslinked, vesiculated granules, characterised in that
(d) where a water-soluble polyamine is used, there are present from 0.3–4.0 amine groups per polyester carboxyl group;
(e) where a metal oxide, hydroxide or salt is used, there is present from 0.8–1.8 equivalents of metal cation per equivalent of polyester carboxyl group; and
(f) the surfactant comprises a species of the formula

where
a is 5–12;
where
R is an alkylene oxide chain having from 2–12 alkylene oxide units selected from ethylene oxide, propylene oxide and butylene oxide, the units being selected such that when there is present in the chain alkylene oxide which is not ethylene oxide, such alkylene oxide shall comprise on average a maximum of two units per chain and such chain shall additionally comprise on average at least 3 ethylene oxide units; and
where
X is an anion having a $pK_1$ of less than 2.

2. A process according to claim 1 characterised in that the surfactant comprises a species of the formula

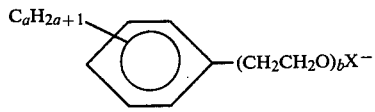

where a is 5–12 and b is 2–12.

3. A process according to claim 1, characterised in that the anion is selected from sulphate, maleate and succinate.

4. A process according to claim 1, characterised in that the counter ion for the species is selected from $NH_4^+$, $Mg^{2+}$ and $K^+$.

5. A process according to claim 1 characterised in that the acid value of the polyester is from 10–25 mg KOH/g.

6. A process according to claim 1 characterised in that, during the formation of the first emulsion, the rate of agitation is such that the tip speed of the stirrer does not exceed about 10 meters/second.

7. A process according to claim 1 characterised in that the tip speed of the stirrer does not exceed 8 meters/second.

* * * * *